(12) United States Patent
Gelber et al.

(10) Patent No.: US 6,378,315 B1
(45) Date of Patent: Apr. 30, 2002

(54) WIRELESS METHOD AND APPARATUS FOR MONITORING AND CONTROLLING FOOD TEMPERATURE

(75) Inventors: Scott Michael Gelber, Kennesaw; John Aggers, Marietta; Abtar Singh, Kennesaw, all of GA (US)

(73) Assignee: Computer Process Controls Inc., Kennesaw, GA (US)

( * ) Notice: Subject to any disclaimer, the term of this patent is extended or adjusted under 35 U.S.C. 154(b) by 0 days.

(21) Appl. No.: 09/702,993

(22) Filed: Oct. 31, 2000

Related U.S. Application Data

(63) Continuation-in-part of application No. 09/564,173, filed on May 3, 2000.

(51) Int. Cl.[7] ............................. F25D 21/00; F25B 7/00
(52) U.S. Cl. ............................. 62/80; 62/175; 236/51; 236/78 D
(58) Field of Search ...................... 62/175, 217; 236/51, 236/78 B, 78 R, 78 D

(56) References Cited

U.S. PATENT DOCUMENTS

| | | | | |
|---|---|---|---|---|
| 5,951,900 A | * | 9/1999 | Smrke | 219/501 |
| 6,116,512 A | * | 9/2000 | Dushane et al. | 236/51 |

* cited by examiner

*Primary Examiner*—William Wayner
(74) *Attorney, Agent, or Firm*—Harness, Dickey & Pierce, P.L.C.

(57) ABSTRACT

A system and method for controlling refrigeration including a temperature sensor operable to measure a temperature from a refrigeration case and a transceiver in communication with the temperature sensor and operable to wirelessly transmit data. A repeater receives the wirelessly transmitted data and further wirelessly transmits the data to a receiver. A controller in communication with the receiver controls the refrigeration system based upon the wirelessly transmitted data from the refrigeration case. The refrigeration case also includes a mode switch for suspending temperature reading and control for a period of time. For example, the mode switch can be used by an operator during cleaning or maintenance of the refrigerator case. Temperature control algorithms are used by the controller, and include: dead-band range (DB), proportional/integral (PI), proportional/integral/differentiation (PID) and fuzzy-logic (FL).

27 Claims, 13 Drawing Sheets

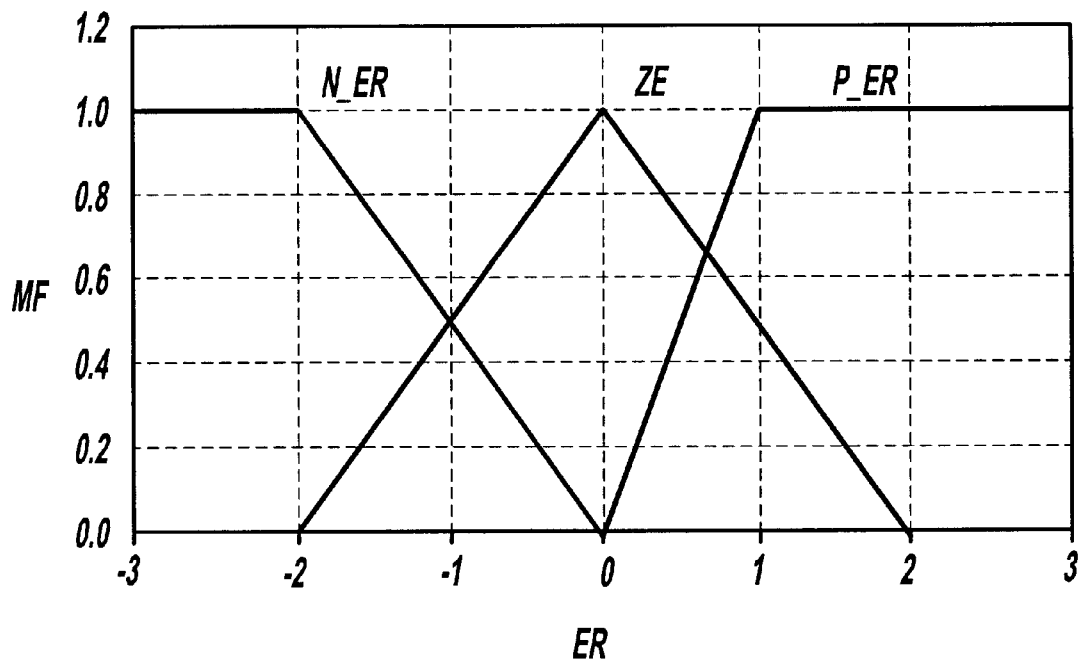
*Graph 1*
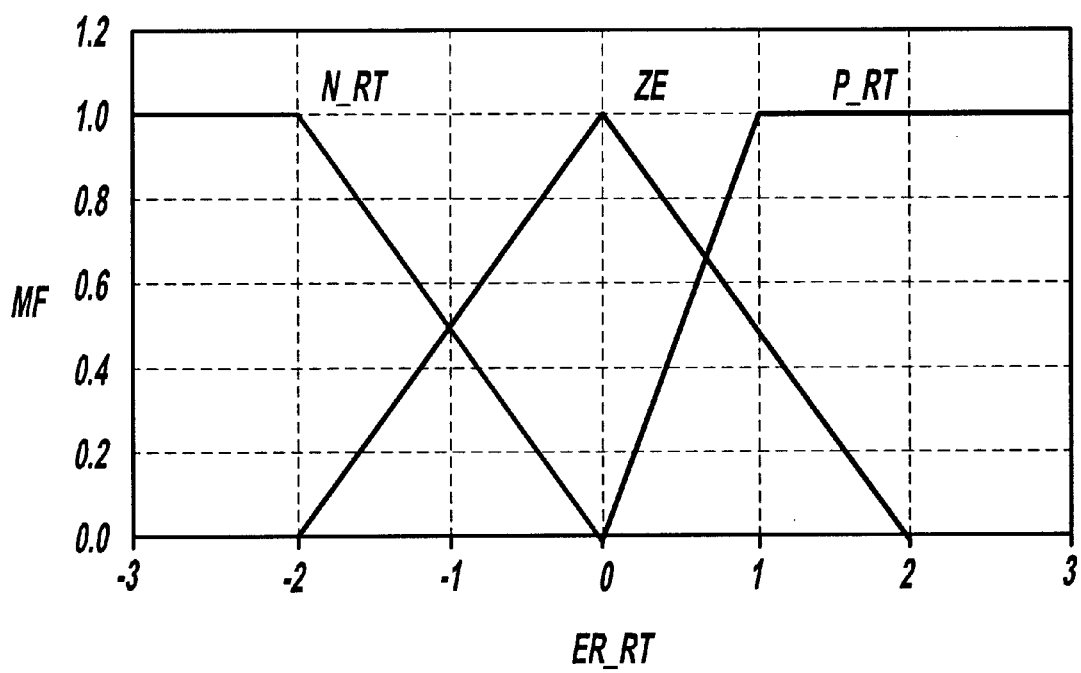
*Graph 2*
*Figure - 15*

WIRELESS METHOD AND APPARATUS FOR MONITORING AND CONTROLLING FOOD TEMPERATURE

This application is a continuation-in-part of application No. 09/564,173, filed with the United States Patent and Trademark Office on May 3, 2000.

FIELD OF THE INVENTION

The present invention relates generally to monitoring and controlling temperature of food display cases and, more specifically, to a method and apparatus for monitoring and controlling food temperature.

BACKGROUND OF THE INVENTION

Produced food travels from processing plants to grocery stores, where the food product remains on display case shelves for extended periods of time. For improved food quality, the food product should not exceed critical temperature limits while being displayed in the grocery store display cases. For uncooked food products, the product temperature should not exceed 41° F. For cooked food products, the product temperature should not be less than 140° F. In other words, the critical temperature limits are approximately 41° and 140° F. Between these critical temperature limits, bacteria grow at a faster rate.

One attempt to maintain food product temperature within safe limits is to monitor the discharge air temperature to ensure that the display case does not become too warm or too cold. But the food product temperature and discharge air temperature do not necessarily correlate; that is, discharge air temperature and food product temperature will not necessarily have the same temperature trend because food product temperatures can vary significantly from discharge air temperature due to the thermal mass of the food product. Further, during initial startup and display case defrost, the air temperature can be as high as 70° F., while food product temperature is much lower for this typically short interval. Finally, it is impractical to measure the temperature of food products at regular intervals in order to monitor food product temperature in a display case.

More specifically, in a conventional refrigeration system, a main controller typically logs or controls temperature. Conventionally, the main controller is installed in the compressor room, which is located on the roof or back of the grocery store. The conventional method for monitoring and controlling the display case temperature requires a discharge air temperature sensor mounted in the display case. The discharge air temperature sensor is typically connected to an analog input board, which is also typically located in the compressor room. A temperature wire must be pulled from the display case to the compressor room, which is typically difficult and increasingly expensive depending on how far away the compressor room is from the display case. Further, this wiring and installation process is more expensive and extremely cumbersome when retrofitting a store.

Additionally, display cases require periodic cleaning or maintenance during which, display case temperature may vary. Therefore, during these periods, it is undesirable for a controller to monitor and control the display case temperature.

SUMMARY OF THE INVENTION

An apparatus, system, and method for controlling a refrigeration system according to the invention overcomes the limitations of the prior art by providing wireless transmission of simulated product data. An apparatus according to the invention includes a plurality of circuits having at least one refrigeration case and a compressor rack. An electronic evaporator pressure regulator in communication with each circuit controls the temperature of one of the circuits. A sensor in communication with each circuit measures a parameter from the circuit, and a transceiver in communication with the sensor wirelessly transmits the measured parameter. A receiver receives the wirelessly transmitted measured parameter. A controller in communication with the receiver controls each electronic evaporator pressure regulator and a suction pressure of said compressor rack based upon the wirelessly transmitted measured parameter from each of the circuits.

Preferably, the transceivers of the present invention are low power. Low-power transceivers have a limited transmission range and would therefore be required to be located in closer proximity to the receiver. Because using a low-power transceiver could limit the distance which a refrigerator case may be located from the receiver, the present invention includes a series of repeaters that receive and transmit signals between the receiver and the refrigerator case. The repeaters act as a bridge, enabling greater distances between the refrigerator case and the receiver.

The present invention also preferably includes a mode switch that is operable in either a first or second mode. The mode switch is usable to signal the controller to suspend temperature recording and regulation. This switch is usable during cleaning or maintenance of a refrigerator case.

BRIEF DESCRIPTION OF THE DRAWINGS

FIG. 15 includes Graph 1 and Graph 2, respectively illustrating error membership function and error rate membership function for use in controlling a refrigeration system.

DETAILED DESCRIPTION OF THE PREFERRED EMBODIMENTS

Figure 1:
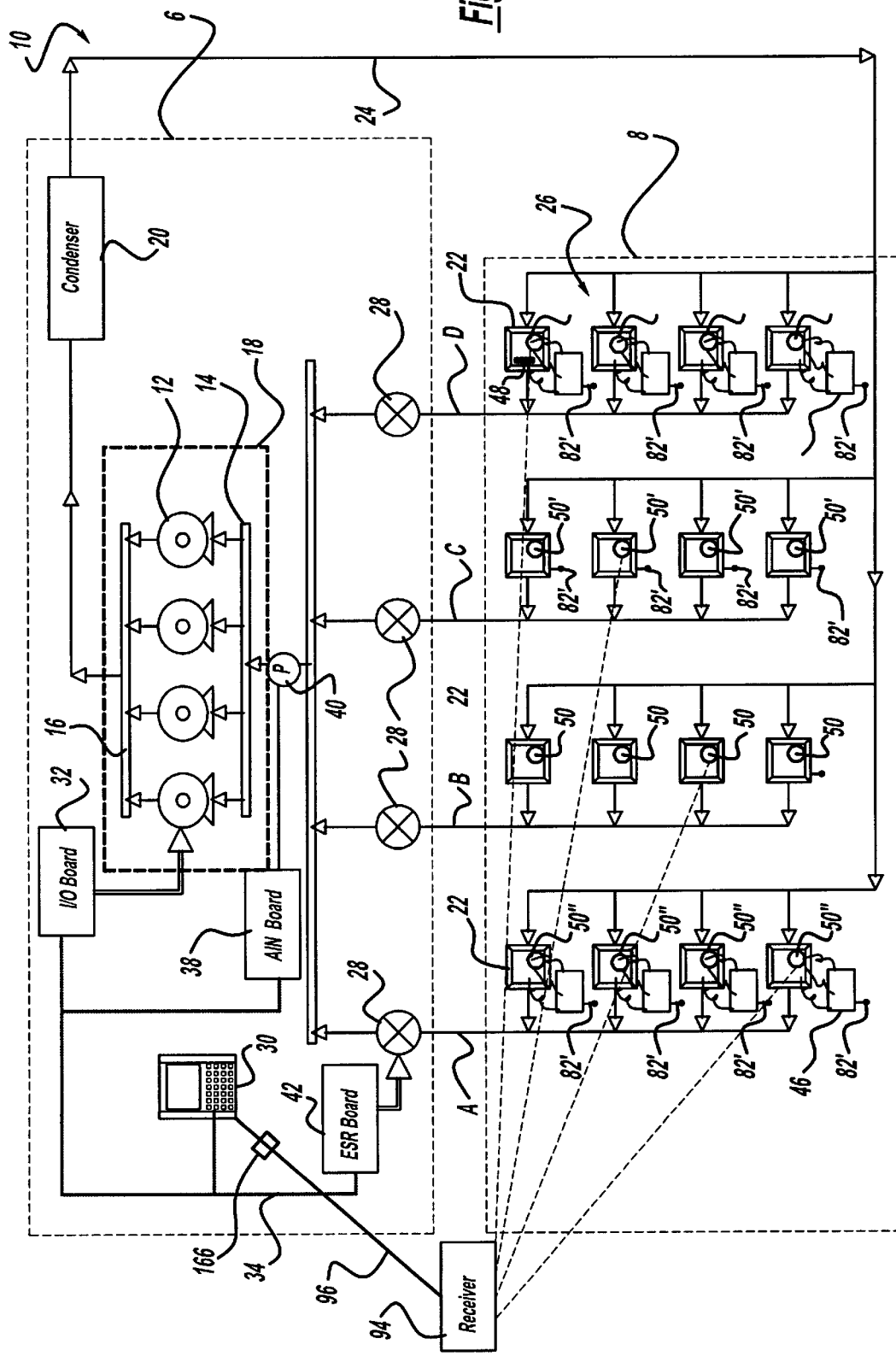
FIG. 1 is a block diagram of a refrigeration system employing a method and apparatus for refrigeration system control according to the teachings of the preferred embodiment in the present invention.

Referring to FIG. 1, a detailed block diagram of a refrigeration system 10 according to the teachings of the preferred embodiment in the present invention is shown. The refrigeration system 10 includes a plurality of compressors 12 piped together in a compressor room 6 with a common suction manifold 14 and a discharge header 16 all positioned within a compressor rack 18. The compressor rack 18 compresses refrigerant vapor that is delivered to a condenser 20 where the refrigerant vapor is liquefied at high pressure. This high-pressure liquid refrigerant is delivered to a plurality of refrigeration cases 22 in a grocery store floor space 8 by way of piping 24. Each refrigeration case 22 is arranged in separate circuits 26 consisting of a plurality of refrigeration cases 22 that operate within a similar temperature range. FIG. 1 illustrates four (4) circuits 26 labeled circuit A, circuit B, circuit C and circuit D. Each circuit 26 is shown consisting of four (4) refrigeration cases 22. Those skilled in the art, however, will recognize that any number of circuits 26 within a refrigeration system 10, as well as any number of refrigeration cases 22 may be employed within a circuit 26. As indicated, each circuit 26 will generally operate within a certain temperature range. For example, circuit A may be for frozen food, circuit B may be for dairy, circuit C may be for meat, etc.

Because the temperature requirement is different for each circuit 26, each circuit 26 includes a pressure regulator 28, preferably an electronic stepper regulator (ESR) or valve, that acts to control the evaporator pressure and hence, the temperature of the refrigerated space in the refrigeration cases 22. Preferably, each refrigeration case 22 also includes its own evaporator and its own expansion valve (not shown), which may be either a mechanical or an electronic valve for controlling the superheat of the refrigerant. In this regard, refrigerant is delivered by piping 24 to the evaporator in each refrigeration case 22. The refrigerant passes through the expansion valve where a pressure drop occurs to change the high-pressure liquid refrigerant to a lower-pressure combination of liquid and vapor. As the warmer air from the refrigeration case 22 moves across the evaporator coil, the low-pressure liquid turns into a gas. This low-pressure gas is delivered to the pressure regulator 28 associated with that particular circuit 26. At the pressure regulator 28, the pressure is dropped as the gas returns to the compressor rack 18 through the common suction manifold 14. At the compressor rack 18, the low-pressure gas is again compressed to a higher pressure and delivered to the condenser 20, which again creates a high-pressure liquid to start the refrigeration cycle over.

To control the various functions of the refrigeration system 10, a main refrigeration controller 30 is used and configured or programmed to executes a control algorithm and includes configuration and logging capabilities. The refrigeration controller 30 controls the operation of each pressure regulator (ESR) 28, as well as the suction pressure set point for the entire compressor rack 18. The refrigeration controller 30 is preferably an Einstein Area Controller offered by CPC, Inc. of Atlanta, Ga., or any other type of programmable controller that may be programmed, as discussed herein and as discussed more fully is U.S. patent application Ser. No. 09/539,563, filed Mar. 31, 2000, entitled "Method And Apparatus For Refrigeration System Control Using Electronic Evaporator Pressure Regulators," incorporated herein by reference. The refrigeration controller 30 controls the bank of compressors 12 in the compressor rack 18 through an input/output module 32. The input/output module 32 has relay switches to turn the compressors 12 on and off to provide the desired suction pressure. A separate case controller, such as a CC-100 case controller, also offered by CPC, Inc. of Atlanta, Ga. may be used to control the superheat of the refrigerant to each refrigeration case 22 through an electronic expansion valve in each refrigeration case 22 by way of a communication network or bus, as discussed more fully the aforementioned U.S. patent application Ser. No. 09/539,563, filed Mar. 31, 2000, entitled "Method And Apparatus For Refrigeration System Control Using Electronic Evaporator Pressure Regulators." Alternatively, a mechanical expansion valve may be used in place of the separate case controller. Should separate case controllers be utilized, the main refrigeration controller 30 may be used to configure each separate case controller, also via the communication bus.

In order to monitor the suction pressure for the compressor rack 18, a pressure transducer 40 is preferably positioned at the input of the compressor rack 18 or just past the pressure regulators 28. The pressure transducer 40 delivers an analog signal to an analog input board 38, which measures the analog signal and delivers this information to the main refrigeration controller 30, via the communication bus 34. The analog input board 38 may be a conventional analog input board utilized in the refrigeration control environment. The pressure transducer 40 enables adaptive control of the suction pressure for the compressor rack 18, further discussed herein and as discussed more fully in the aforementioned U.S. patent application Ser. No. 09/539,563, filed Mar. 31, 2000, entitled "Method And Apparatus For Refrigeration System Control Using Electronic Evaporator Pressure Regulators."

To vary the openings in each pressure regulator 28, an electronic stepper regulator (ESR) board 42 drives up to eight (8) electronic stepper regulators 28. The ESR board 42 is preferably an ESR-8 board offered by CPC, Inc. of Atlanta, Ga., which consists of eight (8) drivers capable of driving the stepper valves 28, via control from the main refrigeration controller 30. The main refrigeration controller 30, input/output module 32, and ESR board 42 are located in a compressor room 6 and are preferably daisy chained via the Communication bus 34 to facilitate the exchange of data between them. The communication bus 34 is preferably either an RS-485 communication bus or a LonWorks Echelon bus.

The suction pressure at the compressor rack 18 is dependent in the temperature requirement for each circuit 26. For example, assume circuit A operates at 10° F. circuit B operates at 15° F. circuit C operates at 20° F. and circuit D operates at 25° F. The suction pressure at the compressor rack 18, which is sensed through the pressure transducer 40, requires a suction pressure set point based on the lowest temperature requirement for all the circuits 26, which, for this example, is circuit A, or the lead circuit. Therefore, the suction pressure at the compressor rack 18 is set to achieve a 10° F. operating temperature for circuit A. This requires the pressure regulator 28 to be substantially opened 100% in circuit A. Thus, if the suction pressure is set for achieving 10° F. at circuit A and no pressure regulator valves 28 were used for each circuit 26, each circuit 26 would operate at the same temperature. Because each circuit 26 is operating at a different temperature, however, the electronic stepper regulators or valves 28 are closed a certain percentage for each circuit 26 to control the corresponding temperature for that particular circuit 26. To raise the temperature to 15° F. for circuit B, the stepper regulator valve 28 in circuit B is closed slightly, the valve 28 in circuit C is closed further, and the valve 28 in circuit D is closed even further providing for the various required temperatures.

Each electronic pressure regulator (ESR) 28 is preferably controlled by the main controller 30 based on food product temperatures approximated by a product simulating probe 50, or based on multiple temperature readings including air-discharge temperature sensed by a discharge temperature sensor 48 and/or food product temperatures approximated by a product simulating probe 50 and transmitted through a display module 46.

In order to control the opening of each pressure regulator 28 based on the temperature of the food product inside each refrigeration case 22, the product temperature is approximated using the product-simulating probe 50 according to the invention. In this regard, each refrigeration case 22 is shown having a product-simulating probe 50 associated therewith. Each refrigeration case 22 may have a separate product-simulating probe 50 to take average/minimum/maximum temperatures used to control the pressure regulator 28 or a single product-simulating probe 50 may be used for a given circuit 26 of refrigeration cases 22, especially because each refrigeration case 22 in operates within substantially the same temperature range for a given circuit 26. These temperature inputs are wirelessly transmitted to an analog input receiver 94, which returns the information to the main refrigeration controller 30 via a communication bus 96. Alternatively, the receiver 94 may be a transceiver for both transmitting and receiving signals.

Figure 2:
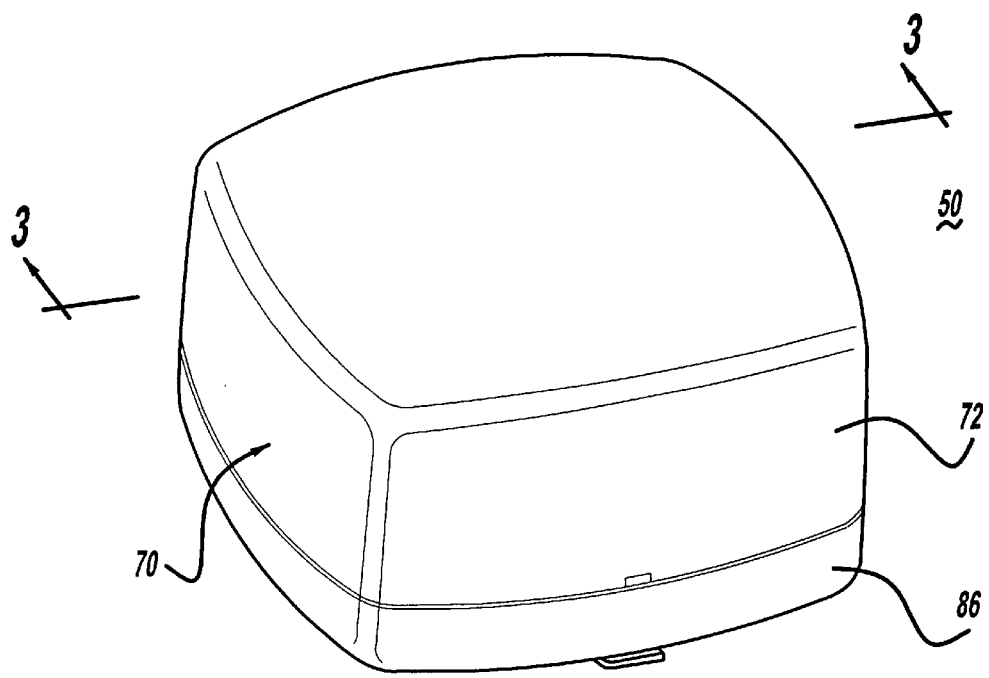
FIG. 2 is a perspective view of a product-simulating probe according to the invention.
Figure 3:
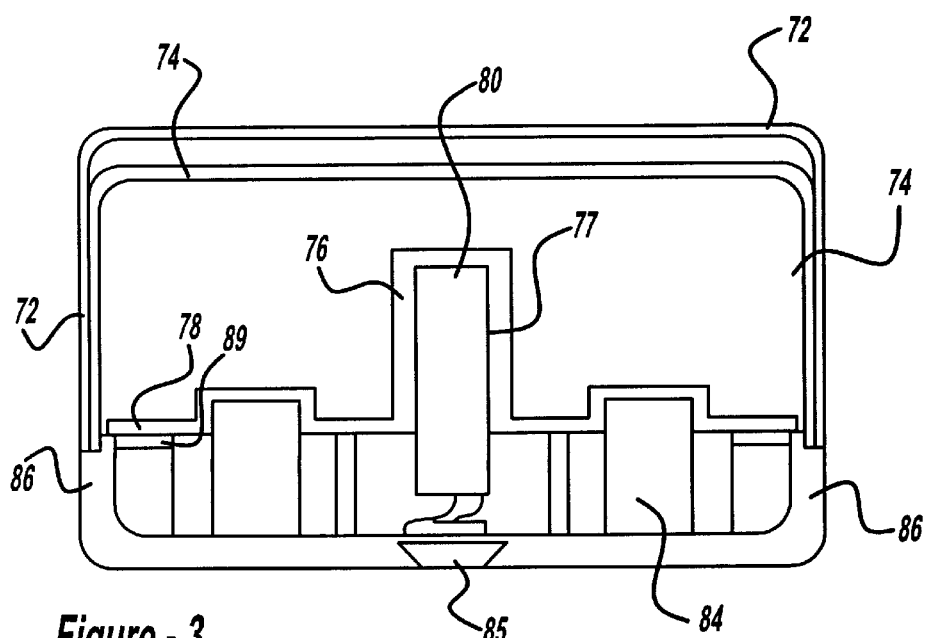
FIG. 3 is a perspective view of the bottom of the product-simulating probe of FIG. 2.
Figure 4:
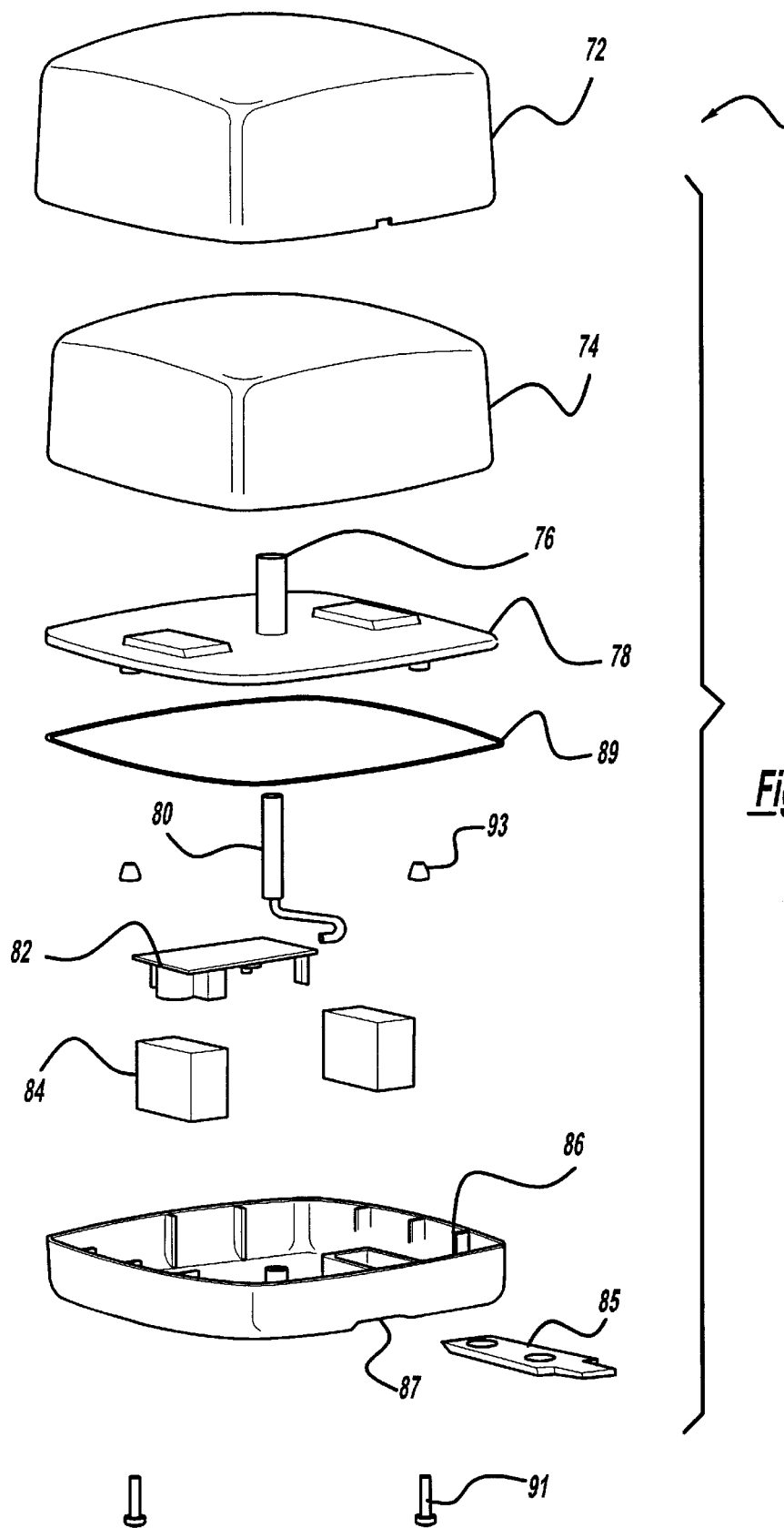
FIG. 4 is an exploded view of the product-simulating probe of FIGS. 2 and 3.

The product-simulating probe 50, as shown in FIGS. 2–4, provides temperature data to the main controller 30. Preferably, the product simulating probe 50 is an integrated temperature measuring and transmitting device including a box-like housing 70 encapsulating a thermal mass 74 and a temperature sensing element 80 and including a wireless transmitter 82. The housing 70 includes a cover 72 secured to a base 86, and magnets 84 mounted to the cover 72 facilitate easy attachment of the probe 50 to the display case 22. Preferably, the cover 72 is adhered to the base 86 to seal the thermal mass 74 therein. In place of magnets 84, a bracket 85 may be used by securing the bracket 85 to the display case 22 and attaching the probe 50 by sliding the bracket into a complimentary slot 87 on the base 86 of the probe 50.

The thermal mass 74 is a container housing a material having thermo-physical characteristics similar to food product. Because food product predominantly contains water, the thermo-physical simulating material is preferably either salt water or a solid material that has the same thermal characteristics as water, such as low-density polyethylene (LDPE) or propylene glycol. The container for the thermal mass is preferably a plastic bag, and most preferably a pliable polypropylene bag, sealably containing the simulating material. Alternatively, a more rigid material can be used, but should include a centrally disposed channel 77 for accommodating the temperature sensing element 80 in close proximity to the material having thermo-physical characteristics similar to food product. Preferably, the thermal mass 74 is a 16-ounce (1-pint) sealed-plastic container filled with four percent (4%) salt water.

The temperature-sensing element 80 is embedded in the center of the thermal mass 74 so that the temperature product probe 50 measures the simulated internal temperature of food products. The temperature-sensing element 80 is preferably a thermistor. A middle plate 78 seals the temperature sensing element 80 and transmitter 82 relative the thermal mass 74 and includes a transversely extending tube 76 that supports the temperature sensing element 80 within the channel 77 of the thermal mass 74. When a pliable plastic material is used to contain the material having thermo-physical characteristics similar to food product, the pliable plastic material forms the channel 77 by accommodating the tube 76 within the thermal mass 74. A gasket 89 is disposed between the middle plate 78 and the base 86 to seal the space between the middle plate 78 and the bottom of the base 86 containing the transmitter 82. Fasteners 91 received through the base 86 secure the middle plate 78 to the base 86 through threaded reception in nut inserts 93 in-molded or secured to the middle plate 78.

The wireless transmitter 82 preferably includes a signal-conditioning circuit, is mounted between the base 86 and the middle plate 85, and is connected to the temperature sensing element 80 via a wire 88. The wireless transmitter 82 is a radio frequency (RF) device that transmits parametric data. Alternatively, the wireless transmitter 82 is a transceiver capable of sending and receiving RF parametric data. Preferably, the wireless transmitter 82 is a standalone transceiver or transmitter that can be positioned independently of other hardware, such as repeaters, operating on internal or external power, that retransmit at the same or different radio frequencies as the parametric data and control inputs and outputs, and one or more transmitters 82 or receivers 94 that are linked to the main controller 30. This is described in greater detail hereinbelow. The wireless transmitter 82 preferably operates on an internal power source, such as a battery, but can alternatively by powered by an external power source.

Figure 5:
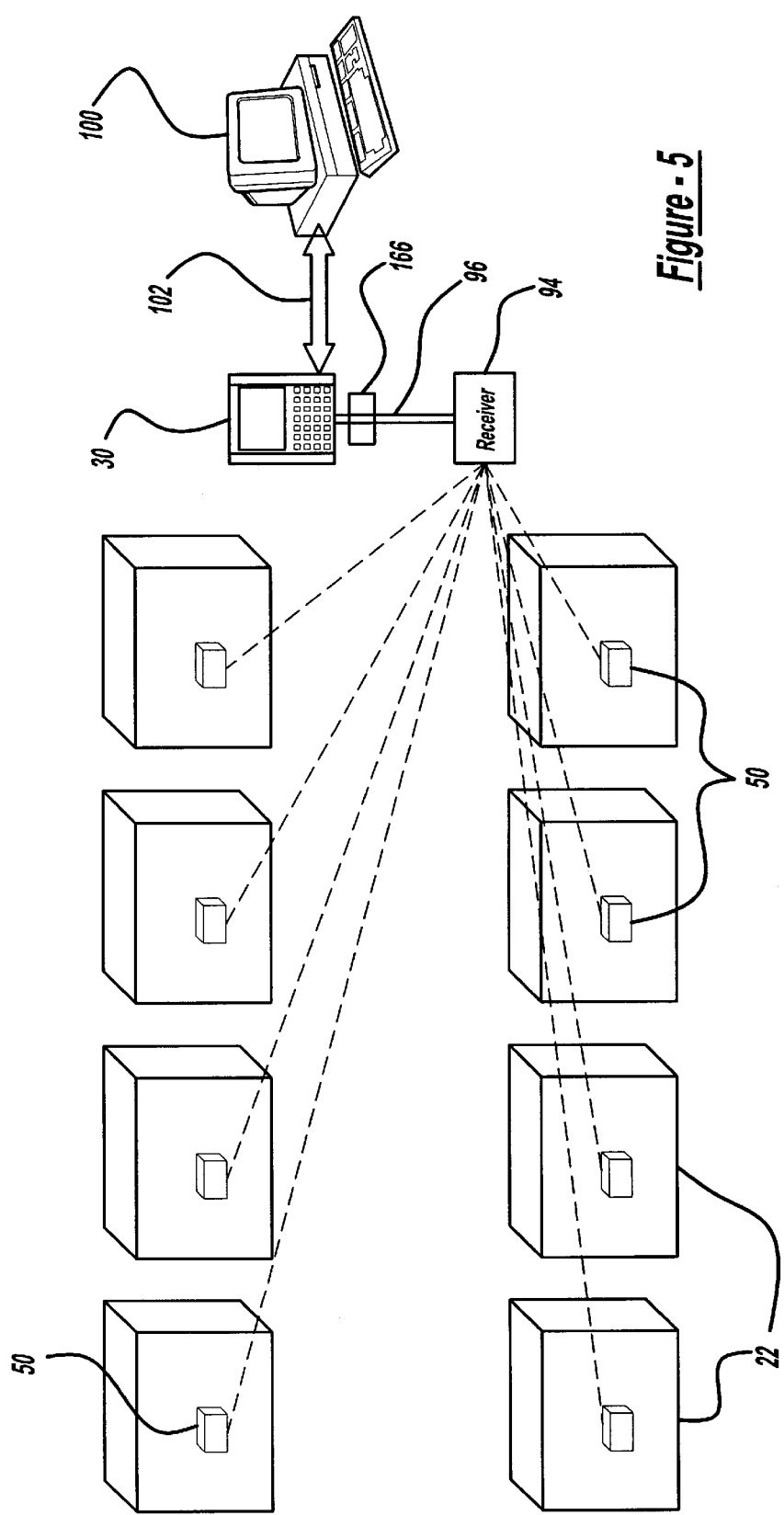
FIG. 5 is a block diagram illustrating one configuration for transferring product temperature data from a display case to a main controller according to the invention.

Preferably, as shown in FIG. 5, the product simulating probe 50 monitors the performance of the display case 22. Preferably, one probe 50 is placed within each display case 22. The product-simulating probe 50 wirelessly transmits simulated product temperature data to the receiver 94, which collects the temperature data and retransmits it to the main controller 30 via the communication bus 96. The main controller 30 logs and analyzes the temperature data, and controls the temperature of the display cases 22 based on the monitored temperature data.

Figure 6:
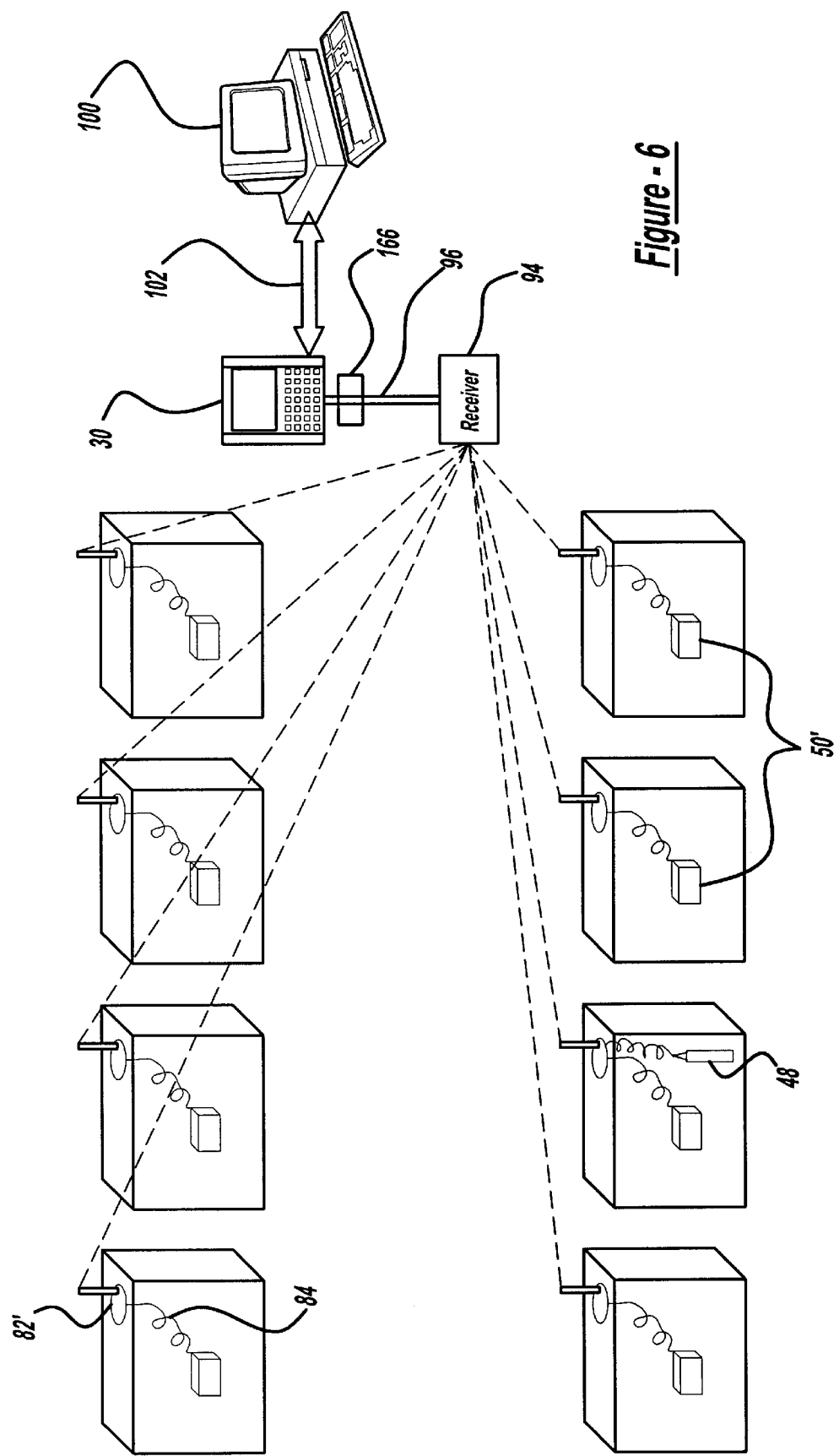
FIG. 6 is a block diagram of another configuration for transferring product temperature data from a display case to a main controller according to the invention.

As shown in FIG. 6, an alternative embodiment of the invention includes disposing a transmitter 82' (which, alternatively, can be a transceiver) apart from a product simulating probe 50' and then connecting the transmitter 82' to the probe 50' via a wire 84. For this variation of the invention, the product simulating probe 50' does not include an internal transmitter 82, but is connected to an external transmitter 82' connected to the temperature sensing element 80 via the wire 84. Optionally, as shown, a discharge air temperature sensor 48, or any other sensor, can similarly be connected to the transmitter 82' for transmission of measured data. The wireless transmitter 82' is mounted externally on the display case 22; for example, mounted on the top of the display case 22. The method of transmitting the temperature data from the product simulating probe 50' to the main controller 30 remains the same as described above.

Figure 7:
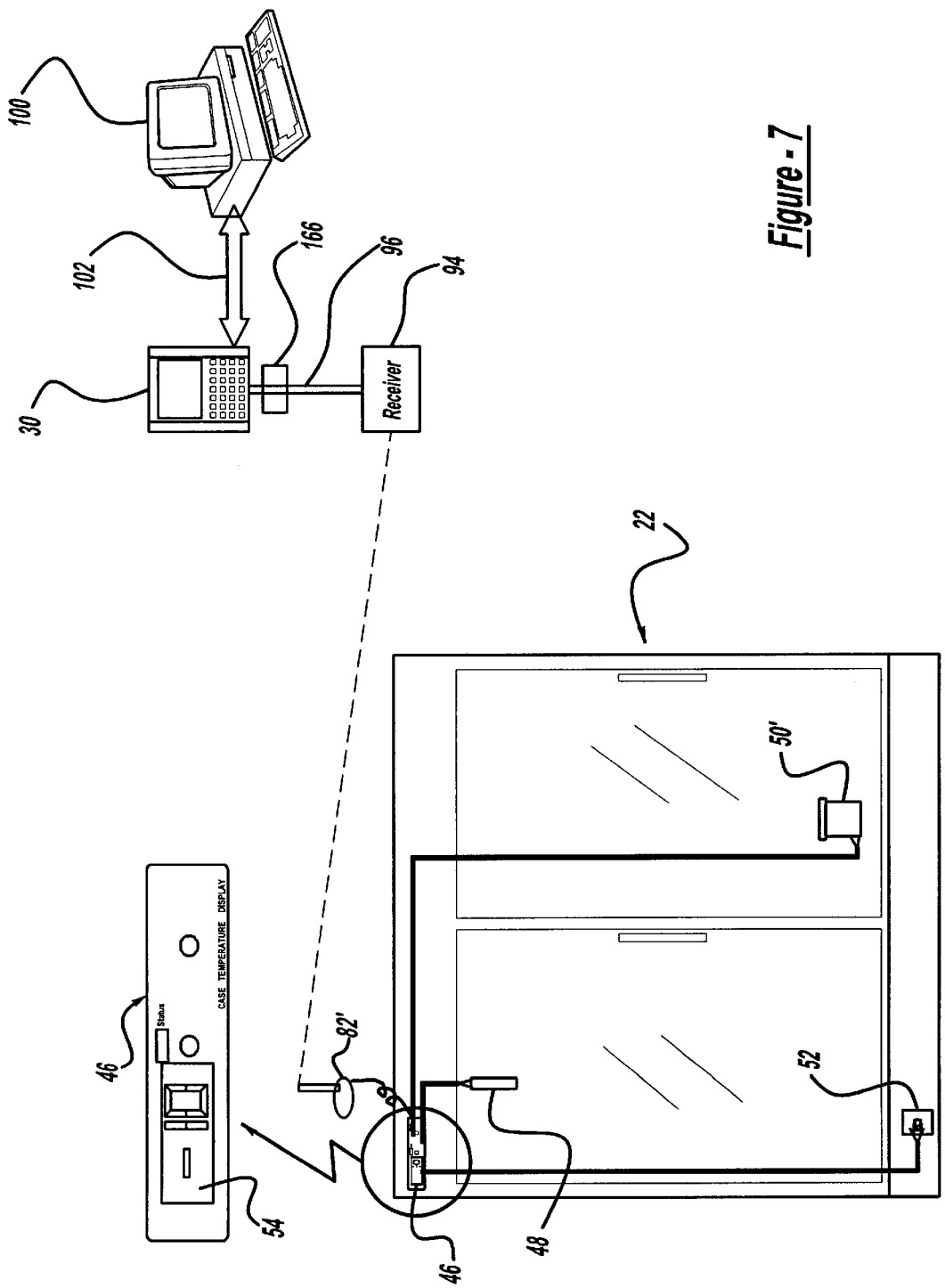
FIG. 7 is a block diagram illustrating yet another configuration for transferring product temperature data and other monitored data from a display case to a main controller according to the invention.

As opposed to using an individual product simulating probe 50 or probe 50' with an external transmitter 82' to transmit the temperature for a refrigeration case 22 to the receiver 94, a temperature display module 46 may alternatively be used as shows in FIG. 7. The temperature display module 46 is preferably a TD3 Case Temperature Display, also offered by CPC, Inc. of Atlanta, Ga. The display module 46 is preferably mounted in each refrigeration case 22, and is connected to the wireless transmitter 82'. Each module 46 preferably measures up to three (3) temperature signals, but more or fewer can be measured depending on the need. These measured signals include the case discharge air temperature measured by a discharge temperature sensor 48, the simulated product temperature measured by a product simulator temperature probe 50', and a defrost termination temperature measured by a defrost termination sensor 52. These sensors may also be interchanged with other sensors, such as return air sensor, evaporator temperature or clean switch sensor. The display module 46 also includes an LED display 54 that can be configured to display any of the temperatures and/or case status (defrost/refrigeration/alarm).

The display module 46 will measure the case discharge air temperature, via the discharge temperature sensor 48 and the product simulated temperature, via the product probe temperature sensor 50 and then wirelessly transmit this data to the main refrigeration controller 30 via the wireless transmitter 82', which transmits data to the receiver 94 connected to the main controller 30 via the communication bus 96. This information is logged and used for subsequent system control utilizing the novel methods discussed herein.

Further, the main controller 30 can be configured by the user to set alarm limits for each case 22, as well as defrosting parameters, based on temperature data measured by the probe 50, or discharge temperature sensor 48, or any other sensor including the defrost termination sensor 52, return air sensor, evaporator temperature or clean switch sensor. When an alarm occurs, the main controller 30 preferably notifies a remotely located central monitoring station 100 via a communication bus 102, including LAN/WAN or remote dial-up using, e.g., TCP/IP. Further, the main controller 30 can notify a store manager or refrigeration service company via a telephone call or page using a modem corrected to a telephone line. The alarm and defrost information can be transmitted from the main refrigeration controller 30 to the display module 46 for displaying the status on the LED display 54.

Figure 8:
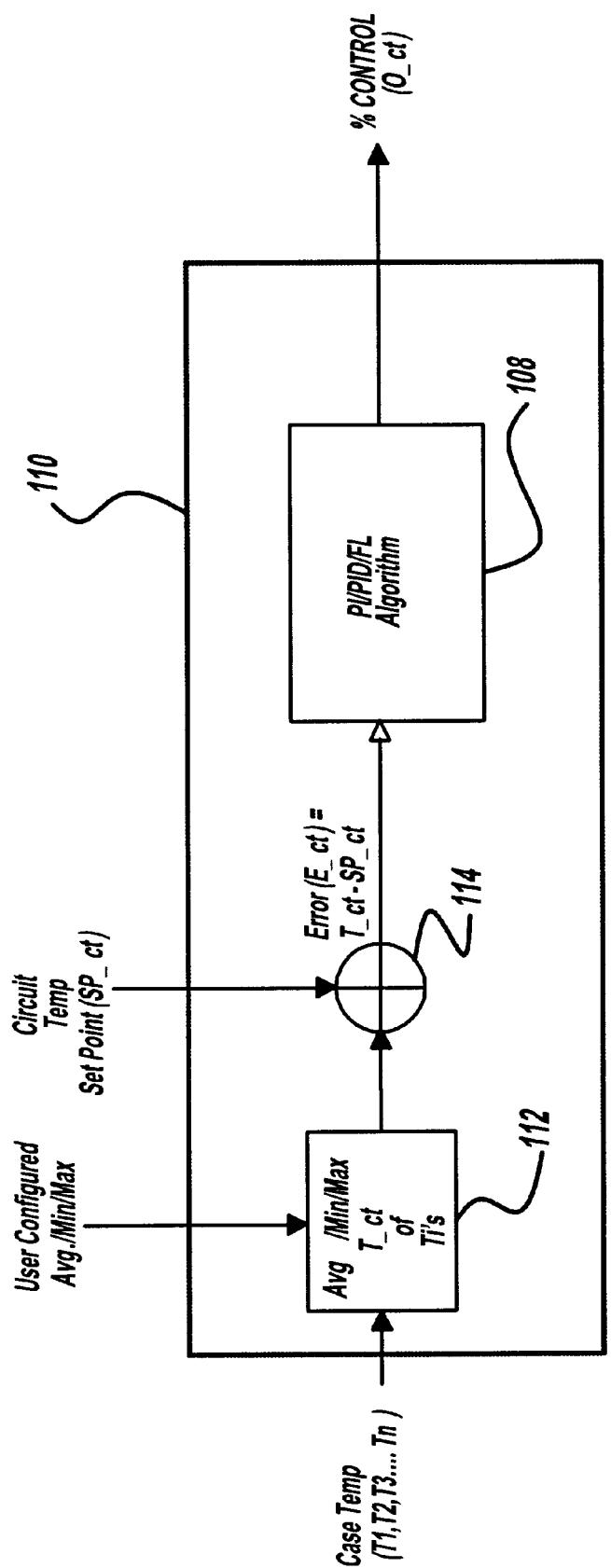
FIG. 8 is a flow chart illustrating circuit temperature control using an electronic pressure regulator.

Referring to FIG. 8, a temperature control logic 70 is shown to control the electronic pressure regulator (ESR) 28 for the particular circuit 26 being analyzed. In this regard, each electronic pressure regulator 28 is controlled by measuring the case temperature with respect to the particular circuit 26. As shown in FIG. 1, each circuit A,B,C,D includes product-simulating probes 50, 50' that wirelessly transmit temperature data to the analog signal receiver 94. The receiver 94 measures the case temperature and transmits the data to the refrigeration controller 30 using the communication network 34. The temperature control logic or algorithm 70 is programmed into the refrigeration controller 30.

The temperature control logic 110 may either receive case temperatures ($T_1$, $T_2$, $T_3$, ... $T_n$) from each case 22 in the particular circuit 26 or a single temperature from one case 22 in the circuit 26. Should multiple temperatures be monitored, these temperatures ($T_1$, $T_2$, $T_3$, ... $T_n$) are manipulated by an average/min/max temperature block 72. Block 72 can either be configured to take the average of each of the temperatures ($T_1$, $T_2$, $T_3$, ... $T_n$) received from each of the cases 22. Alternatively, the average/min/max temperature block 112 may be configured to monitor the minimum and maximum temperatures from the cases 22 to select a mean value to be utilized or some other appropriate value. Selection of which option to use will generally be determined based upon the type of hardware utilized in the refrigeration control system 10. From block 112, the temperature (T_ct) is applied to an error detector 114. The error detector 114 compares the desired circuit temperature set point (SP_ct) which is set by the user in the refrigeration controller 30 to the actual measured temperature (T_ct) to provide an error value (E_ct). Here again, this error value (E_ct) is applied to a PI/PID/Fuzzy Logic algorithm 108, which is a conventional refrigeration control algorithm, to determine a particular percent (%) valve opening, (VO_ct) for the particular electronic pressure regulator (ESR) 28 being controlled via the ESR board 42. Further detail regarding the calculation of VO_ct is provided hereinbelow.

While the temperature control logic 110 is efficient to implement, logistically it had inherent disadvantages. For example, each case temperature measurement sensor required connecting each display case 22 to the analog input board 38, which is generally located in the compressor room 6. This created a lot of wiring and high installation costs. The invention described herein, however, overcomes this limitation by wirelessly arranging the transmission of temperature data from product simulating probes 50, 50', or from other temperature sensors including the discharge temperature sensor 48, defrost termination sensor 52, return air sensor, evaporator temperature or clean switch sensor, etc. A further improvement to this configuration is to use the display module 46, as shown in circuit A of FIG. 1, as well as FIG. 7. In this regard, a temperature sensor within each case 22 passes the temperature information to the display module 46, which wirelessly transmits the data to the receiver 94, which sends the data to the controller 30. Under either version, the temperature data is transferred directly from the refrigeration case 22 to the refrigeration controller 30 without the need for the analog input board 38, or for wiring the various sensors to the analog input board 38, thereby substantially reducing, wiring and installation costs.

Figure 9:
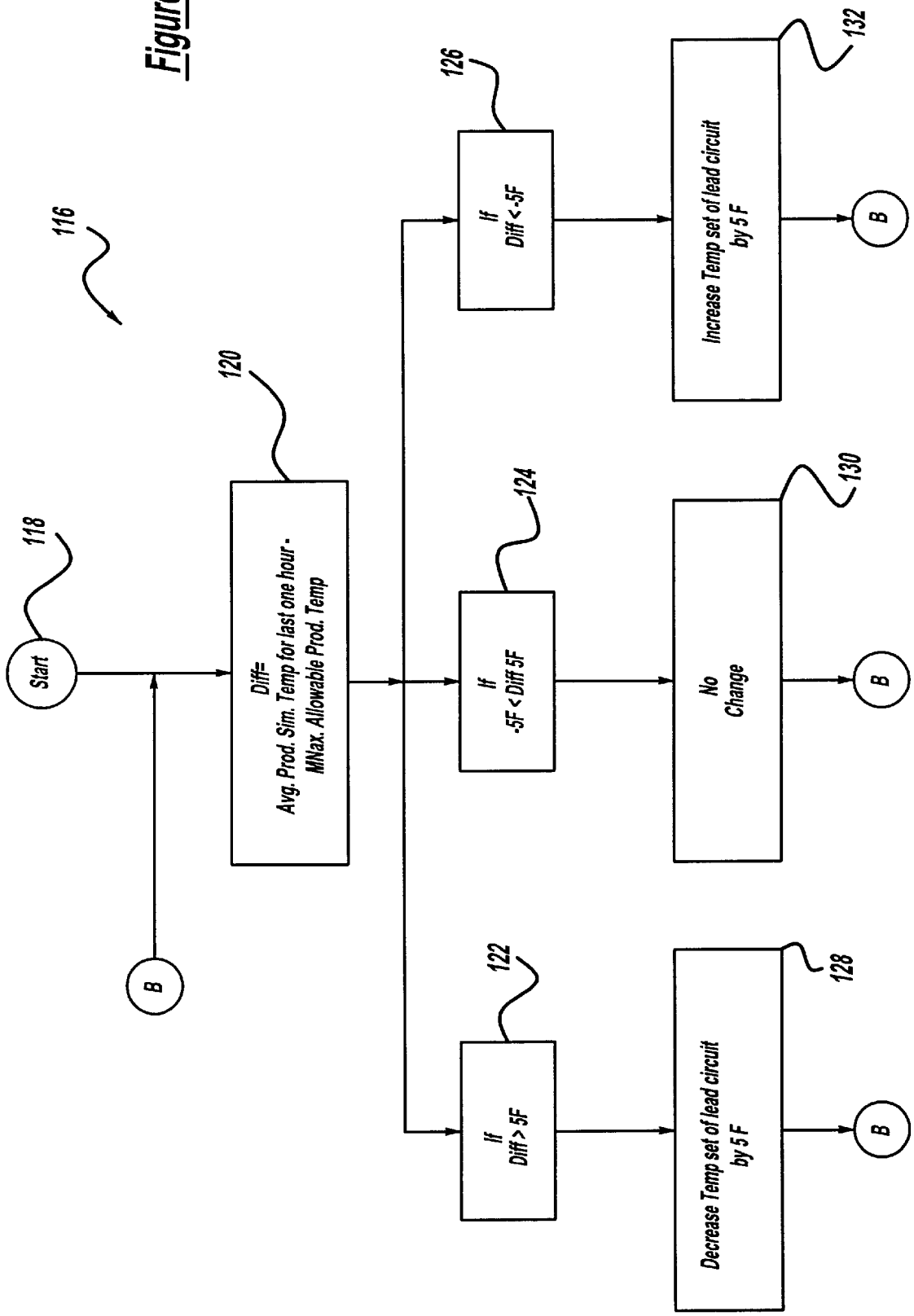
FIG. 9 is a flow chart illustrating floating circuit or case temperature control based upon a product simulator temperature probe.

Referring now to FIG. 9, a floating circuit temperature control logic 116 is illustrated based upon temperature measurements from the product-simulating probe 50, 50'. The floating circuit temperature control logic 116 begins at start block 118. From start block 118, the control logic proceeds to differential block 120. In differential block 120, the average product simulation temperature for the past one-hour or other appropriate time period is subtracted from a maximum allowable product temperature to determine a difference (diff). In this regard, measurements from the product probe 50 are preferably taken, for example, every ten seconds with a running average taken over a certain time period, such as one hour. The type of product being stored in the particular refrigeration case 22 generally controls the maximum allowable product temperature. For example, for meat products, a limit of 41° F. is generally the maximum allowable temperature for maintaining meat in a refrigeration case 22. To provide a further buffer, the maximum allowable product temperature can be set 5° F. lower than this maximum (i.e., 36° for meat).

From differential block 120, the control logic 116 proceeds to determination block 122, determination block 124 or determination block 126. In determination block 122, if the difference between the average product simulator temperature and the maximum allowable product temperature from differential block 120 is greater than 5° F. a decrease of the temperature set point for the particular circuit 26 by 5° F. is performed at change block 128. From here, the control logic returns to start block 118. This branch identifies that the average product temperature is too warm, and therefore, needs to be cooled down. At determination block 124, if the difference is greater than −5° F. and less than 5° F. this indicates that the average product temperature is sufficiently near the maximum allowable product temperature and no change of the temperature set point is performed in block 130. Should the difference be less than −5° F. as determined in determination block 126, an increase in the temperature set point of the circuit by 5° F. is performed in block 132.

By floating the circuit temperature for the entire circuit 26 or the particular case 22 based upon the simulated product temperature, the refrigeration case 22 may be run in a more efficient manner since the control criteria is determined based upon the product temperature and not the case temperature which is a more accurate indication of desired temperatures. It should further be noted that while a differential of 5° F. has been identified in the control logic 116, those skilled in the art would recognize that a higher or a lower temperature differential, may be utilized to provide even further fine tuning and all that is required is a high and low temperature differential limit to float the circuit temperature. It should further be noted that by using the floating circuit temperature control logic 116 in combination with the floating suction pressure control logic 80 further energy efficiencies can be realized. Variations of the above apparatus and method are described in U.S. patent application Ser. No. 09/539,563, filed Mar. 31, 2000, entitled "Method And Apparatus For Refrigeration System Control Using Electronic Evaporator Pressure Regulators," incorporated herein by reference.

Figure 10:
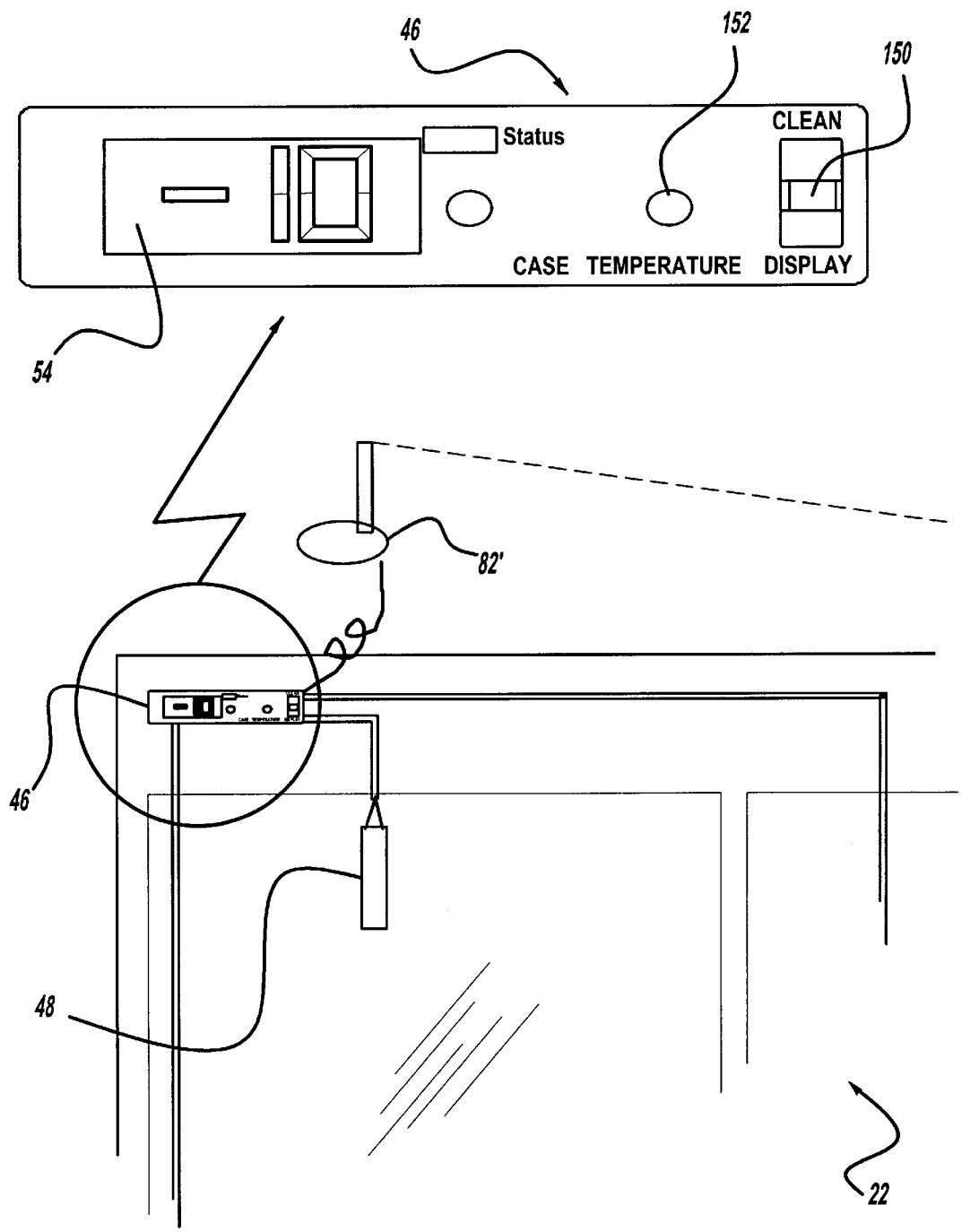
FIG. 10 is a portion of the block diagram as illustrated in FIG. 7, farther including a "clean" mode switch according to the invention.

With reference to FIG. 10, the refrigeration system 10 of the present invention is shown to preferably include a mode switch 150. The mode switch 150 is shown in FIG. 10 to be integrated with the display module 46. It should be noted, however, that the mode switch 150 is not limited to integration with the display module 46 and may be mounted anywhere on, in or near its corresponding refrigeration case 22. The mode switch 150 can be switched from a first position, corresponding to a first mode, and a second position, corresponding to a second mode. The first mode can be characterized as a "normal" operation mode while the second mode can be characterized as a "clean" mode.

As discussed previously, it will be necessary for the refrigeration case 22 to be cleaned as part of a regular cleaning schedule, or in the case of food product spill within the refrigeration case 22. In either event, the temperature reading of the refrigeration case 22 will be disrupted as the result of the cleaning process. This would result in abnormal temperature data being logged by the refrigeration controller 30. To avoid recording of abnormal temperatures, the mode switch 150 is designed to signal the refrigerator controller 30 that a refrigeration case 22 is being cleaned. Upon activation of the mode switch 150, a unique message is transmitted to the refrigerator controller 30. If the message is interpreted by the refrigerator controller 30 as a cleaning signal, no temperature data will be recorded by the refrigeration controller 30 for the particular refrigerator case 22. Once the cleaning process has concluded, the mode switch may be switched back to the "normal" operation mode and recording of temperatures can proceed as normal. Preferably, each refrigerator case 22 is independently controlled by its own mode switch 150. Alternatively, the mode switch may be associated with a set of refrigerator cases 22.

A visual detection means, generally shown as reference numeral 152, is preferably associated with each mode switch 150. The visual detection means 152 enables a user to determine the operating mode of a particular refrigerator case 22 without requiring the user to access the refrigerator controller 30. The visual detection means 152 may include the switch position, a light emitting diode (LED), a liquid crystal display (LCD) or a lamp. The type of visual indicator to be implemented will depend on a particular design.

The transmitters 82,82' for this wireless system are preferably low power, which results in a limited transmission range for sending messages to and from the RF sensors 50,50' and the RF receiver 94. As such, the RF receiver 94 is ideally located closer to the RF sensors 50,50'. However, locating the RF receiver 94 near the RF sensors 50, 50' is not always possible, particularly with larger systems deployed in large buildings and warehouses. For such applications, an RF repeater is useful.

Figure 11:
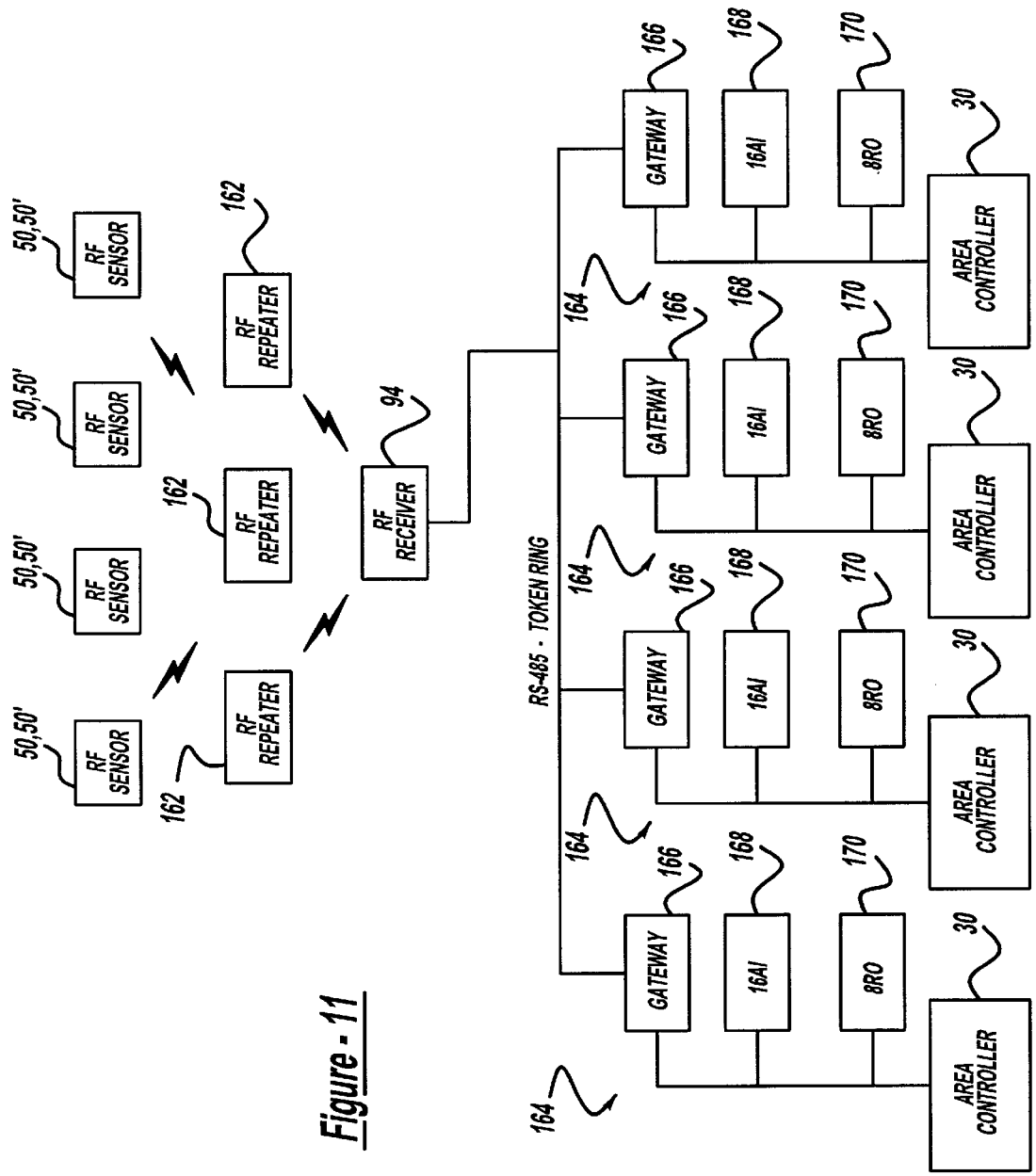
FIG. 11 is a schematic diagram illustrating a radio frequency monitoring system according to the invention.

With particular reference to FIG. 11, a schematic diagram of an RF monitoring system 160 is detailed. The RF monitoring system 160 implements a plurality of RF repeaters 162 to overcome the limited transmission range described above. Each RF repeater 162 acts as a bridge between the receiver 94 and the product simulating probes 50,50' for re-sending messages back and forth. The RF repeaters 162 listen for messages then boost the signal back to the receiver 94. Typically, message "collisions" could occur if multiple RF repeaters 162 started sending a message to the receiver 94 at the same time or at overlapping times. To make the message transmissions deterministic, the receiver 94 uses a polling scheme to collect data from the RF repeaters 162 and to relay request information back to the product simulating probes 50,50' on the input side of the RF repeater. As a result, the RF repeater 162 and the receiver 94 are actually low-power transceivers that must meet certain requirements of the FCC (e.g. Parts 15.247 and 15.249).

In operation, the receiver 94 initially sends a message or "polling" signal to a specific RF repeater 162, signaling, the RF repeater 162 to send all pending data. Upon receipt of this signal, the RF repeater 162 sends all of its pending data to the receiver 94 including an ALL PENDING DATA SENT message. This message signals the receiver 94 that the particular RF repeater 162 has sent all of its pending data. The same steps are then repeated for each RF repeater 162. If the receiver 94 does not receive a return message within one (1) second, it will re-send the SEND ALL PENDING DATA signal two more times to ensure that the particular RF repeater 162 has adequate time to begin data transmission. If the receiver 94 does not receive a return message, the receiver 94 will flag an error and poll the next RF repeater 162. Once having received the data, the receiver 94 routes the data to the appropriate refrigerator controller 30. This is achieved by routing the message through an input/output (I/O) net 164 corresponding to a particular refrigerator controller 30. The individual I/O nets 164, each comprise a gateway 166, an analog input board 168 and a relay output board 170. The analog input board 168 and relay output board are generally used for communicating information from and to, respectively, other components which do not operate with the wireless system. The gateway 166 acts as a bridge between the "wireless" and "normal" communication systems by taking data from the receiver 94 and formatting it for a particular area controller 30.

Figure 12:
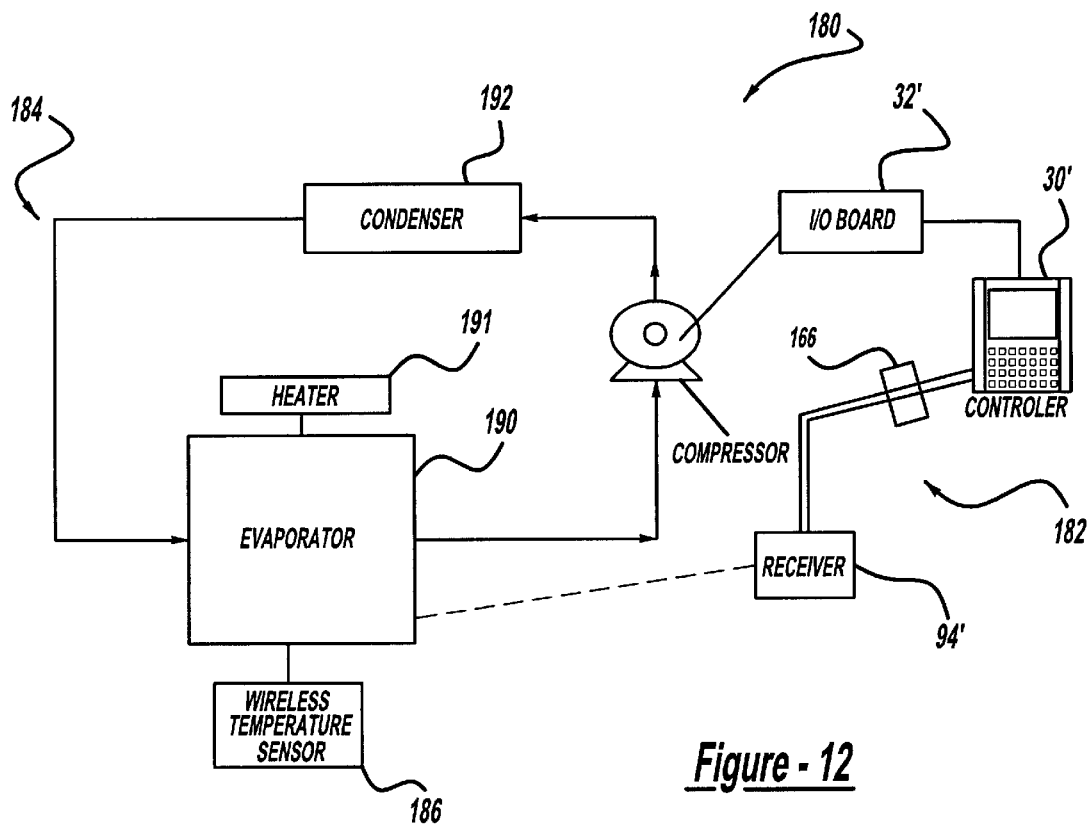
FIG. 12 is a schematic diagram illustrating a simplified diagram of a refrigeration system implementing the teachings of the present invention.

The previously discussed PI, PID and FL logic will be described in further detail, referencing FIG. 12, which schematically shows a simplified refrigerator system 180 implementing the wireless data transmission components described previously. The refrigerator system 180 includes a control loop 182 and a refrigerator loop 184. The control loop 182 generally includes a refrigerator controller 30', an I/O board 32', a receiver 94' and a wireless air temperature sensor 182. The refrigerator loop 184 generally includes a compressor 188, an evaporator 190 and a condenser 192. The wireless air temperature sensor 186 is disposed near the evaporator 190.

Regular operation of the refrigeration system 180 includes daily defrosting of the evaporator 190. Defrosting of the evaporator 190 lasts for a specified duration of time and is preferably accomplished by a heater 191 using an electric heating element, hot gas, or hot air. Generally, defrost is terminated prior to the specified time duration if the temperature of the evaporator 190 goes above a specific value (e.g. 45° F.). A preferred evaporator defrost method of the present invention uses the wireless air temperature sensor 186 (see FIG. 7) for making a defrost determination decision. The wireless temperature sensor could include a thermostat switch of a type known in the art. During defrost, the controller 30' stops refrigeration flow to the evaporation 190 and initiates the heater 191, if any. Where a heater is not used for defrost, simply stopping refrigeration supply to the evaporator 190 initiates defrost by allowing the temperature of the evaporator 190 to rise. The wireless air temperature sensor 186 monitors the temperature of the evaporator 190. This data is sent to the refrigerator controller 30' through the receiver 94'. The refrigerator controller 30' then determines the appropriate output of the compressor 188 and sends a signal through the I/O board 32' to accordingly adjust the operation of the compressor 188.

As previously discussed, there are several preferred algorithms for controlling the temperature within the refrigerator case 22. Again, referencing FIG. 12 for a simpler view, the operation of the compressor 188 is determined by the output of the algorithms. The possible temperature control algorithms include dead-band control (DB), proportional/integral (PI) logic, proportional/integral/differentiation (PID) logic and fuzzy logic (FL).

Figure 13:
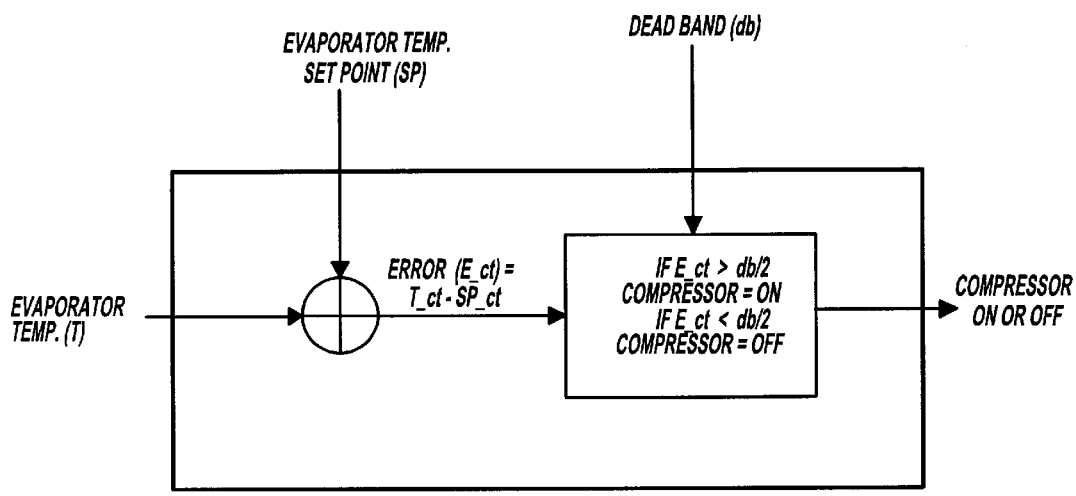
FIG. 13 is a flowchart illustrating evaporator temperature control using dead-band control according to the invention.

FIG. 13 details the dead-band control logic for controlling the evaporator temperature within the refrigerator case 22. The evaporator temperature (T_ct) is initially measured by the wireless air temperature sensor 186 and compared with the set point temperature (SP_ct). The measured temperature can be the temperature relating to a single display case or can be one of either a maximum temperature, a minimum temperature, or an average temperature for a series of display cases in a circuit. The error (E-ct) is calculated as the difference between the measured evaporator temperature (T_ct) and the set point temperature (SP_ct). In addition to pre-setting the SP_ct, a user can also pre-set a "dead-band" range (DB). The DB is a temperature range (e.g. +/−2° F.) between which T_ct is allowed to vary. Once T_ct has reached the upper or lower limit of DB, the compressor 188 is correspondingly operated. Typically the compressor 188 is switched off when T_ct reaches the upper limit and switched on when T_ct reaches the lower limit. Once E_ct has been calculated, the following logic governs the operation of the compressor 188:

If E_ct>DB/2 then ON

If E_ct<−DB/2 then OFF

For example, suppose a user pre-sets SP to be 45° F. with a DB of +/−2° F. If T_ct is less than 43° F. then the compressor 188 will be turned on. If T_ct is greater than 47° F. then the compressor 188 will be turned off.

Figure 14:
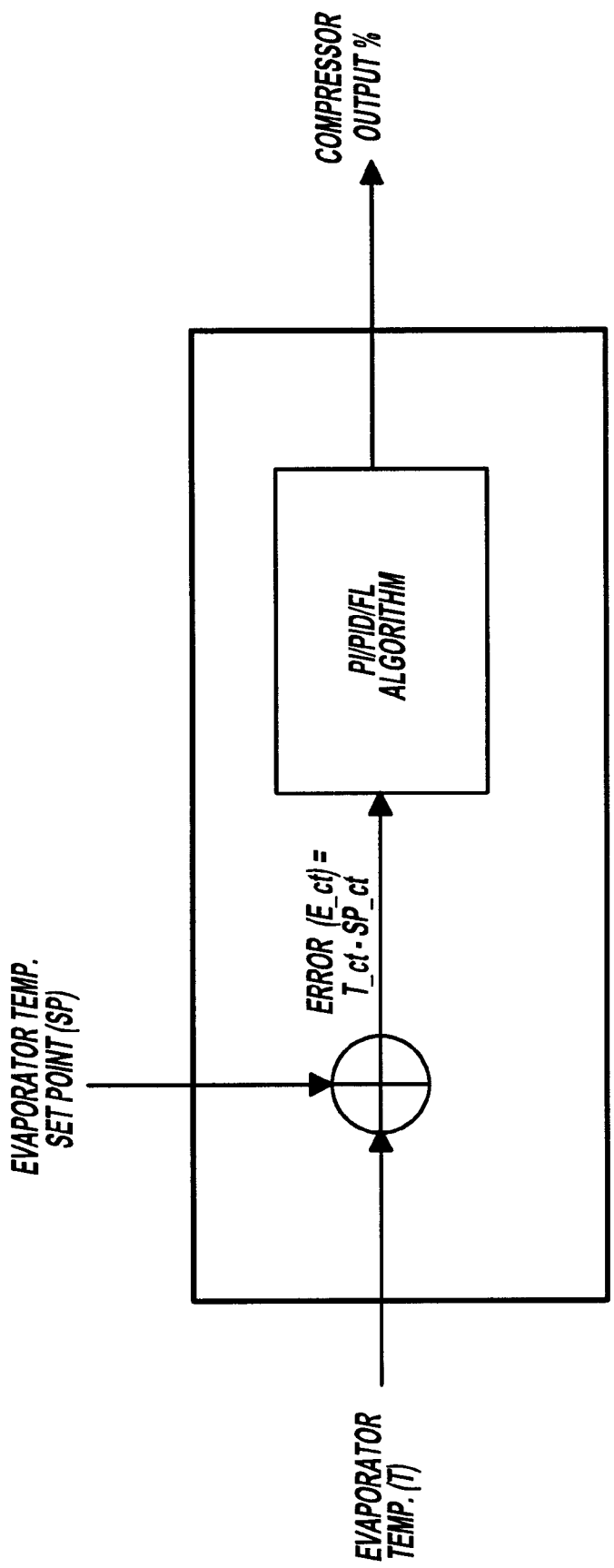
FIG. 14 is a flowchart illustrating evaporator temperature control using PI, PID or FL control according to the invention.

With reference to FIG. 14, the PI, PID and FL logic will be described in detail. Similarly to the DB logic, a user must pre-set a temperature set point (SP_ct). Also, an error (E_ct) is calculated by subtracting SP_ct from a measured evaporator temperature (T_ct). Using the PID logic, three compressor control output calculations occur, each as a function of E_ct. Initially, a proportional compressor value (P) is determined by multiplying E_ct by a proportional constant, $k_p$. This calculation is given by the following formula:

$$P = k_p E\_ct$$

An integral, or summation, compressor control output (I) is also determined. The integral compressor control output is the summation of values of E_ct at a specific sampling rate, over a specific period of time ($\Delta t$). The summation is then multiplied by the time and an integral constant, $k_i$. This is shown in the following formula:

$$I = k_i \Sigma (E\_ct) \Delta t$$

A differentiation compressor value (D) is also calculated as E_ct change per time, multiplied by a differentiation constant, $k_d$, and governed by the following equation:

$$D = k_d [(E_t - E_{t-1})/\Delta t]$$

Each of the compressor control outputs, P, I and D, are then added together to get an overall compressor value (O_ct), which determines the rate at which the compressor 188 should operate. For example, if P determines the compressor 188 to run at 20%, I at 10% and D at −10%, the compressor 188 will be operated at 20% (O_ct=P+I+D).

The PI logic is the same as described above for the PID logic, with the exception that the D compressor value is not considered (i.e., set to zero).

Fuzzy-logic regulates the compressor output based on samples over a period of time. Specifically, E_ct is sampled over a period of time. When a control determination is to be made, the controller 30' selects one of either an average, minimum, or maximum value for E_ct during the sample period. The preferred temperature value is preprogrammed into the controller 30'. The controller 30' also determines an error rate, E_rt, for the sample period. E_rt is the rate at which the E_ct is either increasing or decreasing over the sample period. E_ct and E_rt are then used as inputs into the FL process.

FL will be described by way of example, with the given values of E_ct=0.5 and E_rt=−1.5. With reference to Graphs 1 and 2 of FIG. 15, and Tables 1 and 2 below, the first step is termed "fuzzification", during which, membership functions are determined as a function of E_ct and E_rt, referencing their respective graphs. The membership functions for E_ct include: negative error (N_ER), zero error (ZE) and positive error (P_ER). The membership functions for E_rt include: negative error rate (N_RT), zero error rate (ZE_RT) and positive error rate (P_RT). Reading Graph 1 of FIG. 15, E_ct=0.5 provides P_ER=0.25 and ZE=0.75. Reading Graph 2 of FIG. 15, E_rt=−1.5 provides a N_RT=0.75 and ZE_RT=0.25. The next step includes a "min/max" comparison, where the E_ct and E_rt membership function values are compared in varying combinations to determine the lower (minimum) value. This step, for the current example, proceeds as follows:

(ZE, ZE_RT)=(0.75, 0.25)⇒minimum=0.25

(ZE, N_RT)=(0.75, 0.75)⇒minimum=0.75

(P_ER, ZE_RT)=(0.25, 0.25)⇒minimum=0.25

(P_ER, N_RT)=(0.25, 0.75)⇒minimum=0.25

Table 1 is then referenced to determine the respective changes in output for each of the membership comparisons designated above.

TABLE 1

|      | N_RT | ZE_RT | P_RT |
|------|------|-------|------|
| N_ER | BNC  | SNC   | SPC  |
| ZE   | MNC  | MPC   | MPC  |
| P_ER | SNC  | SPC   | BPC  |

The changes in output are defined as:

TABLE 2

| Changes in Output     | Abbreviation | % Change |
|-----------------------|--------------|----------|
| Big Negative Change   | BNC          | −30      |
| Medium Negative Change| MNC          | −20      |
| Small Negative Change | SNC          | −10      |
| No Change             | NC           | 0        |
| Small Positive Change | SPC          | 10       |
| Medium Positive Change| MPC          | 20       |
| Big Negative Change   | BPC          | 30       |

Referencing Tables 1 and 2, the following values are provided for the current example:

(ZE, ZE_RT)=(0.75, 0.25)⇒minimum=0.25 and (ZE, ZE_RT)= NC (ZE, N_RT)=(0.75, 0.75)⇒minimum=0.75 and (ZE, N_RT)= MNC (P_ER, ZE_RT)=(0.25, 0.25)⇒minimum=0.25 and (P_ER, ZE_RT)=SPC (P_ER, N_RT)=(0.25, 0.75)⇒minimum=0.25 and (P_ER, N_RT)=SNC If a change in output was repeated, the change in output corresponding to the maximum comparison value is chosen and the other is not considered. For example, suppose MNC was the result for two of the above comparisons. The MNC change in output corresponding to the highest membership function value is used and the other is not considered in the subsequent calculations.

The Final step includes a "defuzzification" process which calculates a percentage change in compressor control output as a function of the "minimum" comparison values and the change in output values. For the current example, these values include:

(ZE, ZE_RT)⇒0.25 and NC=0%

(ZE, N_RT)⇒0.75 and MNC=−20%

(P_ER, ZE_RT)⇒0.25 and SPC=10%

(P_ER, N_RT)⇒0.25 and SNC=−10%

The percentage change in compressor control output is calculated as follows:

$$\frac{(0.25)*(0\%) + (0.75)*(-20\%) + (0.25)*(10\%) + (0.25)*(-10\%)}{(0.25 + 0.75 + 0.25 + 0.25)} = -10\%$$

For this example, the controller 30' is signalled to reduce the compressor output by 10%. Therefore, if the compressor 188 was currently operating at 70%, the controller 30' signals a reduction to 60%. In a preferred embodiment, the controller 30' is preprogrammed with limit values of 0 and 100%. If the FL procedure calculates a Compressor Adjustment %=−30% and the compressor 188 is currently operating at 20%, it is not feasible for the compressor 188 to operate at −10%. Therefore, the controller 30' triggers the lower limit and signals the compressor 188 to operate at 0%, or "off". Similarly, suppose the FL procedure calculates a Compressor Adjustment %=20%, and the compressor 188 is currently operating at 90%. It is not feasible for the compressor 188 to operate at 110%, therefore, the controller 30' triggers the upper limit and signals the compressor 188 to operate at 100%.

In addition, the controller 30' may be controlling more than one compressor for a given refrigeration system. As such, the control method could be varied across the compressors. For example, suppose two compressors are utilized and the controller 30' determines a Compressor Adjustment Value=50%. In such a case, one compressor could be shut off and the other operated at 100%, or both could operate at 50%.

It is important to note that the above described control and defrost methods, with reference to the refrigerator system 180, can be easily adapted for implementation with a more complex refrigerator system, such as refrigerator system 10 of FIG. 1, as will be readily understood by one skilled in the art.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A system for controlling refrigeration, comprising:
at least one refrigeration case;
a temperature sensor operable to measure a temperature from said at least one refrigeration case;
a transmitter in communication with said temperature sensor and operable to wirelessly transmit data including said temperature;
a receiver adapted to receive said wirelessly transmitted data including said temperature;
a controller in communication with said receiver to receive said wirelessly transmitted data and operable to control said temperature of at least one refrigeration case based upon said wirelessly transmitted data from said at least one refrigeration case; and
a mode switch for selectively suspending said controller from control of said temperature of said at least one refrigeration case.

2. The system of claim 1 wherein said transmitter is a first transceiver adapted to transmit and receive signals.

3. The system of claim 2 wherein said receiver is a second transceiver adapted to transmit data to said first transceiver.

4. The system of claim 1 wherein activation of said mode switch to a first mode transmits a unique message from said transmitter to said receiver for signaling said controller to suspend control of said temperature of said at least one refrigeration case.

5. The system of claim 1 wherein said temperature sensor is a simulated product temperature sensor including a housing containing a thermal mass having thermo-physical properties similar to food product and a thermistor for measuring the temperature of said thermal mass.

6. The system of claim 1 wherein said temperature sensor is an ambient case air temperature sensor operable to measure an ambient case air temperature in said at least one refrigeration case.

7. The system of claim 1 wherein said temperature sensor is a defrost termination temperature sensor operable to measure a defrost termination temperature in said at least one refrigeration case and in communication with said transmitter, said wirelessly transmitted data including said defrost termination temperature.

8. The system of claim 7 wherein said sensor is a thermostat switch.

9. The system of claim 1 wherein said temperature sensor measures an ambient temperature of said refrigeration case, and further comprising a defrost termination temperature sensor operable to measure a defrost termination temperature and a simulated product temperature sensor operable to measure a simulated product temperature; said wirelessly transmitted data including said ambient air temperature, said defrost termination temperature, and said simulated product temperature.

10. The system of claim 1 wherein said controller is configured to include user-defined alarm limits for said wirelessly transmitted data.

11. The system of claim 10 further comprising a remote monitoring station for remotely monitoring said wirelessly transmitted data and remotely signaling said alarm limits.

12. A method for refrigeration system control, said method comprising:
  measuring a first parameter from at least one refrigeration case;
  wirelessly transmitting said measured first parameter to a repeater;
  transmitting a polling signal from a receiver to said repeater;
  transmitting a response signal to said polling signal from said repeater to said receiver; and
  communicating said response signal from said receiver to a remote controller electronically controlling said at least one refrigeration case by said remote controller to affect said measured first parameter.

13. The method as defined in claim 12 wherein said step of transmitting a polling signal includes repeatedly transmitting a polling signal until said receiver receives said response signal.

14. The method as defined in claim 12 wherein said response signal includes said first parameter.

15. The method as defined in claim 12 wherein said first signal comprises a data request.

16. The method as defined in claim 12 wherein said response signal further includes a signal notifying said receiver that said repeater has transmitted all data.

17. The method as defined in claim 12 further comprising:
  measuring a second parameter from another refrigeration case;
  transmitting said response signal to said receiver, wherein said response signal includes said second parameter; and
  electronically controlling said another refrigeration case to affect said measured second parameter.

18. The method as defined in claim 17 wherein said at least one refrigeration case is in a first circuit and said another refrigeration case is in a second circuit.

19. A method for refrigeration system control, said method comprising:
  setting a set point temperature for a circuit having at least one refrigerator case;
  determining a temperature for said at least one refrigerator case;
  wirelessly transmitting said temperature from said circuit to a system controller;
  determining an error value as a function of said set point and said temperature;
  determining a compressor control value as a function of said error value;
  wirelessly controlling a compressor as a function of said compressor control value;
  dividing upper and lower limits of a dead-band range in half; and
  comparing said error value to said halves of said upper and lower limits of said dead-band range;
  wherein said compressor control value is controlled off if said error value is greater than half of said upper limit and is controlled on if said error value is less than half of said lower limit.

20. The method of claim 19 wherein determining a compressor control value as a function of said error value includes the steps of:
  calculating a first value by multiplying said error value by a first constant;
  calculating a second value as a summation of said error value over a defined time and multiplying said summation by a second constant; and
  adding said first and second values to determine said compressor control value.

21. The method of claim 20 further including the steps of:
  calculating a third value as a change is said error value over a defined time and multiplying by a third constant; and
  adding said third value to said first and second values.

22. A method for refrigeration system control, said method comprising:
  setting a set point temperature for a circuit having at least one refrigerator case;
  determining a temperature for said at least one refrigerator case;
  wirelessly transmitting said temperature from said circuit to a system controller;
  determining an error value as a function of said set point and said temperature;
  determining a compressor control value as a function of said error value;
  wirelessly controlling a compressor as a function of said compressor control value;
  sampling said error value over a period of time;
  determining an error rate over said period of time;
  determining a first set of values as a function of a specific error value and said error rate;
  determining a second set of values as a function of said specific error value and said error rate; and
  calculating said compressor control value as a function of said first and second sets of values.

23. The method of claim 22 wherein said first and second sets of values are determined from a look-up table.

24. A method for refrigeration system control, said method comprising:
  setting a set point temperature for a circuit having at least one refrigerator case;
  determining a temperature for said at least one refrigerator case;
  wirelessly transmitting said temperature from said circuit to a system controller;
  determining an error value as a function of said set point and said temperature;

determining a compressor control value as a function of said error value; and wirelessly controlling a compressor as a function of said compressor control value;

wherein said temperature is one of either a minimum temperature, a maximum temperature or an average temperature of said refrigeration cases in a circuit of refrigeration cases.

25. The method of claim 24 wherein determining a compressor control value as a function of said error value includes the steps of:

dividing upper and lower limits of a dead-band range in half; and comparing said error value to said halves of said upper and lower limits of said dead-band range;

wherein said compressor control valve is controlled off if said error value is greater than half of said upper limit and is controlled on if said error value is less than or equal to half of said lower limit.

26. The method of claim 23 wherein determining a compressor control value as a function of said error value includes the steps of:

calculating a first value by multiplying said error value by a first constant;

calculating a second value as a summation of said error value over a defined time and multiplying said summation by a second constant; and adding said first and second values to determine said compressor control value.

27. The method of claim 26 further including the steps of:

calculating a third value as a change is said error value over a defined time and multiplying by a third constant; and adding said third value to said first and second values.

* * * * *

UNITED STATES PATENT AND TRADEMARK OFFICE
CERTIFICATE OF CORRECTION

PATENT NO. : 6,378,315 B1
DATED : April 30, 2002
INVENTOR(S) : Scott M. Gelber et al.

It is certified that error appears in the above-identified patent and that said Letters Patent is hereby corrected as shown below:

<u>Column 2,</u>
Line 61, "farther" should be -- further --.

<u>Column 3,</u>
Line 64, "executes" should be -- execute --.

<u>Column 4,</u>
Line 19, after "fully" insert -- in --.
Line 53, "Communication" should be -- communication --.
Line 59, after "F." insert -- , --.
Line 60, (first occurrence), after "F." insert -- , --.

<u>Column 5,</u>
Line 33, after "22" delete "in".
Line 53, "complimentary" should be -- complementary --.

<u>Column 6,</u>
Line 9, after "relative" insert -- to -- .
Line 38, (first occurrence), "by" should be -- be --.

<u>Column 7,</u>
Line 40, "corrected" should be -- connected --.

<u>Column 11,</u>
Line 18, "evaporation" should be -- evaporator --.

<u>Column 13,</u>
Line 6, (first occurrence), "MPC" should be -- NC --.
Line 40, "Final" should be -- final --.

<u>Column 16,</u>
Line 27, "is" should be -- in --.

UNITED STATES PATENT AND TRADEMARK OFFICE
CERTIFICATE OF CORRECTION

PATENT NO. : 6,378,315 B1
DATED : April 30, 2002
INVENTOR(S) : Scott M. Gelber et al.

It is certified that error appears in the above-identified patent and that said Letters Patent is hereby corrected as shown below:

<u>Column 18,</u>
Line 1, "23" should be -- 25 --.
Line 15, "is" should be -- in --.

Signed and Sealed this

Twelfth Day of August, 2003

JAMES E. ROGAN
*Director of the United States Patent and Trademark Office*